(12) United States Patent
Clouthier et al.

(10) Patent No.: US 8,036,938 B2
(45) Date of Patent: Oct. 11, 2011

(54) PERSONAL CHECK ACCEPTANCE SYSTEMS AND METHODS

(75) Inventors: Michael Clouthier, Highlands Ranch, CO (US); Daniel Ahles, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 375 days.

(21) Appl. No.: 11/966,238

(22) Filed: Dec. 28, 2007

(65) Prior Publication Data

US 2009/0171795 A1 Jul. 2, 2009

(51) Int. Cl.
*G06Q 20/00* (2006.01)
(52) U.S. Cl. ............... 705/17; 705/26; 705/42; 705/44; 705/75; 235/382; 235/379
(58) Field of Classification Search .............. None
See application file for complete search history.

(56) References Cited

U.S. PATENT DOCUMENTS

| | | | |
|---|---|---|---|
| 6,330,550 B1 * | 12/2001 | Brisebois et al. | 705/75 |
| 6,547,132 B1 | 4/2003 | Templeton et al. | |
| 7,108,174 B2 | 9/2006 | Sellen et al. | |
| 7,124,936 B2 | 10/2006 | Templeton et al. | |
| 7,191,941 B1 | 3/2007 | Mollett et al. | |
| 2003/0121966 A1 * | 7/2003 | George et al. | 235/375 |
| 2003/0140007 A1 | 7/2003 | Kramer et al. | |
| 2003/0144866 A1 | 7/2003 | Pagliari et al. | |
| 2004/0111371 A1 * | 6/2004 | Friedman | 705/42 |
| 2006/0229978 A1 * | 10/2006 | Popovic et al. | 705/39 |

OTHER PUBLICATIONS

PCT International Search Report and Written Opinion mailed Feb. 17, 2009; International Application No. PCT/US2008/087779, 13 pages.

* cited by examiner

*Primary Examiner* — Luna Champagne
(74) *Attorney, Agent, or Firm* — Kilpatrick, Townsend & Stockton, LLP

(57) ABSTRACT

Tools for facilitating the acceptance of personal checks and other presentation instruments. The tools, in some aspects, allow for preauthorization of a personal check (or other presentation instrument) prior to the merchant receiving the actual check, allowing a merchant, for example, to accept an order by phone, obtain details about the check that will be used to pay for the order, obtain preauthorization to accept the check, and arrange for delivery of the order. Upon delivering the order, the merchant can receive the check, and then obtain a full authorization to accept the check. The full authorization can be based primarily on the preauthorization, giving the merchant assurance that the check will in fact be authorized. In some cases, the tools of the invention also settle the check; in a particular aspect, the check can be settled without requiring the merchant to deposit the check.

28 Claims, 5 Drawing Sheets

PERSONAL CHECK ACCEPTANCE SYSTEMS AND METHODS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, tools for accepting personal checks and more particularly, to tools for preauthorizing personal checks prior to provision of goods or services and/or for electronically settling personal checks after receipt of goods and services by the customer.

BACKGROUND

In the past, most transactions for the purchase of goods and/or services were performed face-to-face, and such transactions typically were performed in a store, as opposed to at the customer's location. For example, in a typical transaction, a customer would go to a merchant's place of business (sometimes referred to as the "point of sale"), pay for the goods/services, and then either pick them up or have them delivered, as appropriate. Often, a presentation instrument, such as a personal or business check, is used as the means of payment in such transactions. In recent years, merchants have begun to utilize the services of financial transaction processors, who, inter alia, can provide check acceptance services. In a typical implementation of such a service, when the merchant receives a personal check (or other presentation instrument), the merchant obtains authorization from the transaction processor to accept the check prior to providing the goods/services to the user. The transaction processor typically will evaluate the check against a list of known fraudulent check writers, accounts used to write fraudulent checks, and/or the like. In this way, the transaction processor can provide some assurance (and, in some cases, a guarantee) to the merchant that the check will "clear" (i.e., that the customer's financial institution will honor the check).

In the modern economy, however, an ever-increasing number of transactions are performed at locations other than in the merchant's place of business and, in many cases, without face-to-face interaction (indeed, a typical transaction might take place between a merchant and a customer on different continents). Such transactions include, inter alia, telephone orders, Internet orders, and the like. Typically, such transactions will feature a payment by credit card, since it is relatively easy to provide credit card details over the phone or electronically. Many customers, however, either cannot obtain a credit card or uncomfortable with their use, for a variety of reasons (including interest charges, reluctance to borrow money, privacy and/or security concerns, and the like). For such customers, purchasing items without a face-to-face transaction can be difficult.

One solution to this problem is the traditional "cash on delivery" technique, where the user takes delivery of goods and/or services, and then provides cash to the deliverer of the goods/services. This technique, however, requires the customer to have sufficient cash on hand at the time of delivery, and it raises additional security concerns for the customer, who has to take on faith the deliverer's assurances that the cash will be returned to the merchant. As a result, many "cash on delivery" transactions actually involve the customer providing a personal or business check to the delivery person.

This "check on delivery" type of transaction, however, raises issues as well. In particular, simply by the nature of the transaction, a merchant who accepts a check on delivery typically cannot obtain the assurances of a transaction provider that the check will clear prior to delivering the goods, since the goods are delivered before the merchant obtains the check.

Hence, there is a need for more robust tools for facilitating the acceptance of checks and other presentation instruments. It would be of particular benefit for such tools to allow a merchant some assurance that a check will clear, even if the check is received by the merchant after the goods/services already have been delivered. It would provide additional benefit, in many cases, if the merchant were able to have the presentation instrument settled without having to deposit the instrument at the merchant's bank.

BRIEF SUMMARY

In an aspect, embodiments of the invention provide tools for facilitating the acceptance of presentation instruments. Merely by way of example, some embodiments can be used to facilitate the acceptance of personal checks by merchants, typically in exchange for goods and/or services. In an aspect, some embodiments allow for preauthorization of a personal check (or other presentation instrument) prior to the merchant receiving the actual check. Hence, for example, a merchant can accept an order by phone, obtain details about the check that will be used to pay for the order, obtain preauthorization to accept the check, and arrange for delivery of the order. Upon delivering the order, the merchant's delivery service (which might be an employee or agent of the merchant, and/or might be a third party, such as a common carrier, etc.), can obtain the check (e.g., "check on delivery" or "COD") and return it to the merchant, who then obtains a full authorization to accept the check. In an aspect, the full authorization is based primarily on the earlier preauthorization (and an evaluation of the consistency between the details of the preauthorization and the particulars of the actual presentation instrument obtained from the customer), so that the merchant has assurance that, so long as the actual instrument is consistent with the data provided at preauthorization (and, optionally, that the actual instrument is accepted within a specified time frame of the preauthorization), acceptance of the check will be authorized.

In another aspect of some embodiments, the preauthorization informs the authorization process. Hence, the preauthorization might, in some cases, involve a variety of risk analyses based on the data provided to and/or by the merchant (such as, merely by way of example, an estimated amount of the check, a check number, account number, bank name, routing number, and/or the like). The authorization process, then, in some cases, confirms that the actual check data matches this preauthorization data within specified parameters, and if so, acceptance of the check may be authorized.

In yet another aspect, some embodiments employ a "paperless" settlement process for the presentation instrument received by the merchant. A variety of paperless processes may be implemented in accordance with various embodiments, but examples include, without limitation, a remotely-created draft process, in which the check processor creates a new check for negotiation and/or settlement from the data provided by the merchant; an automated clearinghouse transaction; a back office conversion transaction; a prearranged payment and deposit transaction; and a substitute check, image replacement document and/or check truncation procedure, (as allowed by the Check Clearing for the 21st Century Act, for example).

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, one set of embodiments provides methods. An exemplary method of accepting a presentation instrument comprises receiving, at a merchant and from a customer, a request for goods or services. In accordance with the method, the merchant also receives, at a first point in time, a first set of data sufficient to identify a presentation instrument to be used to pay for at least a portion of the goods or services. This presentation instrument, in an embodiment, is drawn upon an account at a financial institution. In an aspect, this first set of data might comprise an estimated payable amount of the presentation instrument. In another aspect, the merchant might not receive the presentation instrument, prior to providing the requested goods or services.

The method might further comprise the merchant providing the first set of data to a point of sale device at a location of the merchant. Hence, the first set of data might be received at the point of sale device and from the merchant and/or transmitted from the point of sale device. The first set of data might then be received at a host computer, which, in an aspect of some embodiments, stores the first set of data and/or evaluates the first set of data. The method might further comprise preauthorizing, at the host computer, acceptance of the presentation instrument, based on an evaluation of the set of data. In addition, the method might comprise transmitting a preauthorization message from the host computer to the point of sale device; in an aspect the preauthorization message evidences a preauthorization of acceptance of the presentation instrument. The method, in some cases, further comprises displaying, at the point of sale device, an indication of the preauthorization message.

In accordance with some embodiments, the method further comprises delivering the goods or services to the customer, based at least in part on the preauthorization, and/or receiving, from the customer, the presentation instrument, upon delivery of the goods or services. The method, then, might comprise providing, at a second point in time and to the point of sale device, a second set of data from the presentation instrument; this second set of data, in an aspect, might comprise an actual payable amount of the presentation instrument. The second set of data may be transmitted from the point of sale device to the host computer, received at the host computer, and/or evaluated at the host computer. In a certain embodiment, evaluating the second set of data comprises comparing the estimated payable amount with the actual payable amount and comparing the first point in time with the second point in time. The method might further comprise automatically authorizing acceptance the payment instrument. This authorization, in an aspect, is based only on the preauthorization, a determination that the actual payable amount does not exceed the estimated payable amount by more than a threshold amount, and/or a determination that the second point in time is within a threshold period of the first point in time. Optionally, the method might also include settling the payment instrument, based only on the second set of data, without requiring the merchant to deposit the payment instrument, such that the merchant receives an amount of funds specified by the payment instrument.

Another exemplary method, in accordance with some embodiments, can be implemented in a transaction in which a merchant receives a request from a customer for goods or services, at least a portion of which are to be purchased using a presentation instrument to be received by the merchant after delivery of the goods or services. The method comprises receiving, at a point of sale device, a first set of data sufficient to identify a presentation instrument to be used to pay for at least a portion of the goods or services; in an aspect, the first data set comprises estimated payable amount of the presentation instrument. In another aspect, the presentation instrument is drawn upon an account at a financial institution.

The method might further comprise transmitting, from the point of sale device, the first set of data, receiving the first set of data at a host computer, storing the first set of data at the host computer, and/or evaluating the set of data at the host computer. Based upon an evaluation of the set of data, the host computer, in some embodiments, authorizes acceptance of the presentation instrument.

In accordance with certain embodiments, the method further comprises receiving, at the point of sale device and upon receipt of the presentation instrument by the merchant, a second set of data derived from the presentation instrument. In an aspect, the second set of data comprises an actual payable amount of the presentation instrument. This second set of data might be transmitted from the point of sale device to the host computer, received at the host computer, and/or evaluated at the host computer. In an aspect, evaluating the second set of data comprises comparing the estimated payable amount with the actual payable amount. The method might further comprise automatically authorizing acceptance of the payment instrument, based on the preauthorization and an evaluation of the second set of data. The first set of data might be sent from a first point of sale device, while the second set of data might be sent from a second point of sale device; the first point of sale device might be, but need not be, the same point of sale device as the second point of sale device.

Yet another method in accordance with other embodiments also can be used in a transaction in which a merchant receives a request from a customer for goods or services, at least a portion of which are to be purchased using a presentation instrument to be received by the merchant after delivery of the goods or services. This exemplary method comprises receiving, at a host computer and from a point of sale device, a first set of data sufficient to identify a presentation instrument to be used to pay for at least a portion of the goods or services; in an aspect, this first set of data comprises an estimated payable amount of the presentation instrument.

The method, in some embodiments, further comprises storing the first set of data at the host computer, evaluating the first set of data at the host computer, and/or based on an evaluation of the set of data, preauthorizing, at the host computer, acceptance of the presentation instrument. In an aspect, the method also includes receiving (e.g., based upon receipt of the presentation instrument by the merchant), at the host computer and from the point of sale device, a second set of data derived from the presentation instrument; the second set of data might comprise an actual payable amount of the presentation instrument.

The method might also comprise evaluating the second set of data at the host computer; in an aspect, evaluating the second set of data comprises comparing the estimated payable amount with the actual payable amount. Acceptance of the payment instrument then many be authorized automatically, based on the preauthorization and an evaluation of the second set of data, and/or an authorization message may be transmitted to the point of sale device; this authorization message might instruct the point of sale device to display an authorization indication for a user.

Another set of embodiments provides computer programs. An exemplary embodiment provides an apparatus comprising a computer readable medium having encoded thereon a set of instructions executable by a computer system to perform a set of one or more operations. In an embodiment, the set of instructions includes instructions for receiving, at the computer system, a first set of data sufficient to identify a presentation instrument to be used to pay for at least a portion of the goods or services and comprising an estimated payable amount of the presentation instrument. The set of instructions might also include instructions for storing the first set of data, instructions for evaluating the first set of data and/or instructions for preauthorizing, based on an evaluation of the set of data, acceptance of the presentation instrument.

In another embodiment, the set of instructions also includes instructions for receiving, from the point of sale device and/or based upon receipt of the presentation instrument by the merchant, a second set of data derived from the presentation instrument; in an aspect, the second set of data comprises an actual payable amount of the presentation instrument. The set of instructions can further include instructions for evaluating the second set of data (which might comprise, without limitation instructions for comparing the estimated payable amount with the actual payable amount) and/or instructions for automatically authorizing acceptance of the payment instrument, based on the preauthorization and an evaluation of the second set of data.

In another aspect, the apparatus might further include a second computer readable medium having encoded thereon a second set of instructions executable by a second computer system (which might be a point of sale device, to name one example) to perform one or more operations. The second set of instructions might include instructions for receiving the first set of data from the merchant, instructions for transmitting the first set of data to the host computer, instructions for receiving the second set of data from the merchant, and/or instructions for transmitting the second set of data to the host computer.

An exemplary computer system in accordance with some embodiments includes a host computer, which comprises a processor, a communication interface in communication with the processor and/or a computer readable medium in communication with the processor. The computer readable medium, in an aspect, comprises a set of instructions (such as the set of instructions described above, to name one example) executable by the processor to perform one or more operations in accordance with the methods of the invention. In certain embodiments, the computer system might further comprise a point of sale device in communication with the communication interface. In an aspect, the point of sale device comprises a second processor and a second computer readable medium in communication with the second processor. The second computer readable medium might comprise a second set of instructions executable by the point of sale device to perform one or more operations in accordance with methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
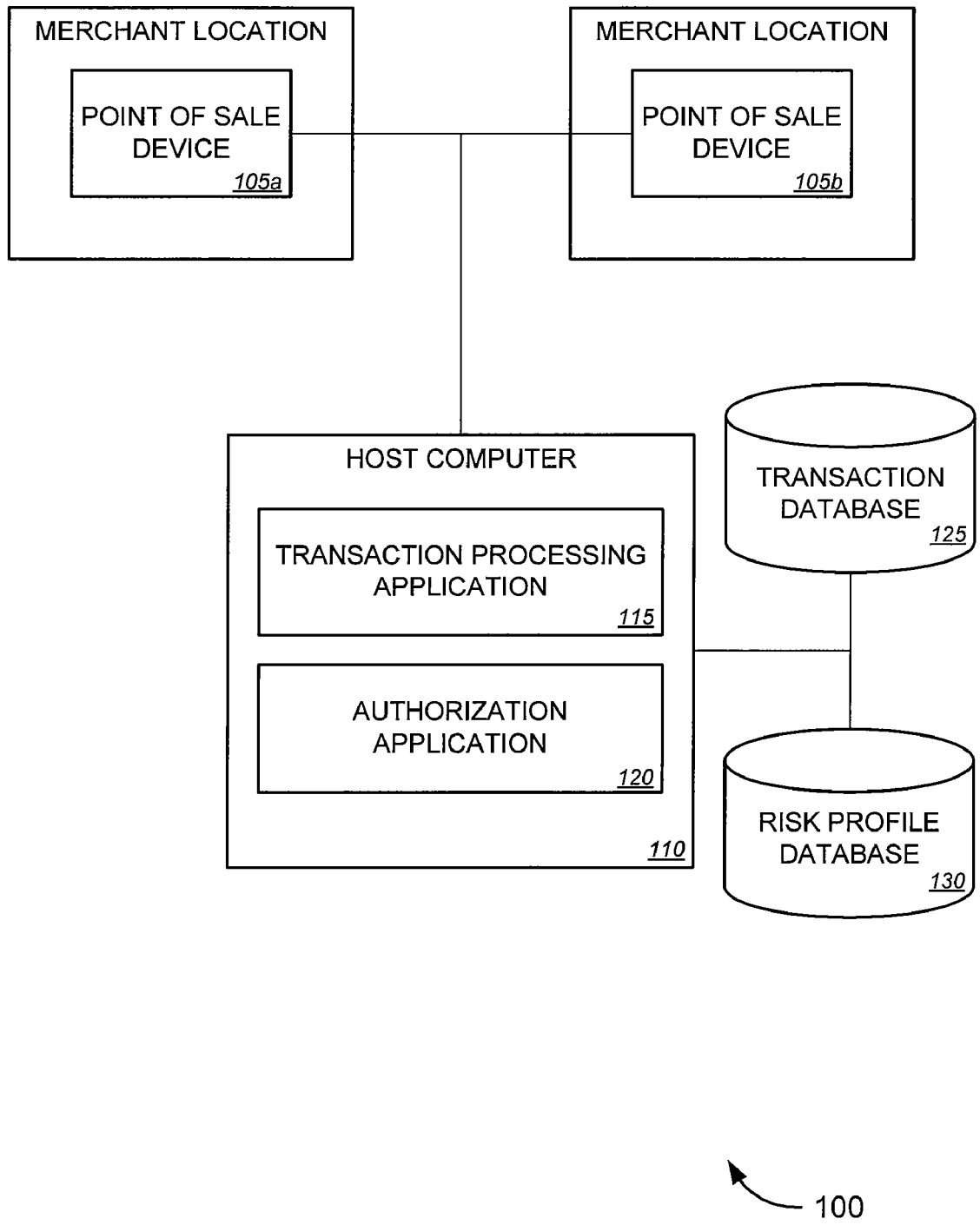
FIG. 1 is a block diagram illustrating a system for providing personal check acceptance services, in accordance with various embodiments of the invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In an aspect, embodiments of the invention provide tools (including, without limitation, methods, systems, and software) for facilitating the acceptance of presentation instruments. As used herein, the term "presentation instrument" means any type of written payment instrument that draws from a deposit account (or quasi-deposit account, such as home equity line of credit, etc.) and is negotiable using standard check-negotiation procedures (such as a paper deposit, substitute check and/or image replacement document procedure, automated clearinghouse ("ACH") settlement, back office conversion ("BOC") settlement, and/or prearranged payment and deposit ("PPD") settlement, to name a few examples), rather than credit card networks for settlement. Examples of presentation instruments include, but are not limited to, personal checks, business checks, third party checks, traveler's checks, money orders, and/or the like.

Merely by way of example, some embodiments can be used to facilitate the acceptance of personal checks by merchants, typically in exchange for goods and/or services. In an aspect, a host computer preauthorizes acceptance of a personal check (or other presentation instrument), based on a request received from the merchant via a point of sale ("POS") device, prior to the merchant receiving the actual check. Hence, for example, a merchant can accept an order by phone, obtain details about the check that will be used to pay for the order, obtain preauthorization to accept the check, and arrange for delivery of the order. Upon delivering the order, the merchant's delivery service (which might be an employee or agent of the merchant, and/or might be a third party, such as a common carrier, etc.), can obtain the check (e.g., "check on delivery" or "COD") and return it to the merchant. In this exemplary process, the merchant, using the data from the actual check (amount, check number, account number, routing number, and/or the like) requests (again, typically via a POS device) authorization from the host computer to accept the check.

As used herein, the term "preauthorization" means a preliminary authorization for a merchant to accept a payment instrument based on preliminary data, supplied to a host computer, about a presentation instrument. By contrast, the term "authorization" means a full authorization based on information obtained from the actual presentation instrument itself. An authorization to accept a payment instrument often will be accompanied by some sort of guarantee, e.g., from a check processor that issues the authorization, that the payment instrument will "clear" (i.e., that the payment instrument will be exchanged successfully for a corresponding amount of cash or other tender, subject to any processing fees, etc.). By its nature, a preauthorization typically will not carry any such guarantee; instead, the preauthorization typically will be subject to a later authorization process.

In an aspect, the host computer compares the data obtained during the preauthorization request with data obtained during the authorization request. Merely by way of example, if the particulars of the actual check (e.g., check number, bank name, account number, routing number) match the corresponding particulars provided during preauthorization, the amount of the check is within a specified threshold of the amount estimated during preauthorization, and/or the authorization request is within a specified time window of the preauthorization request, the host computer will authorize the check based on the preauthorization. In this way, the merchant effectively can be guaranteed that acceptance of the check will be authorized, assuming the check was preauthorized and the authorization data sufficiently matches the preauthorization data.

In yet another aspect, some embodiments employ a "paperless" settlement process for the presentation instrument received by the merchant. A variety of paperless processes may be implemented in accordance with various embodiments, but examples include, without limitation, a remotely-created draft process, in which the check processor creates a new check for negotiation and/or settlement from the data provided by the merchant; an automated clearinghouse transaction; a back office conversion transaction; a prearranged payment and deposit transaction; a substitute check, check truncation and/or image replacement document procedure (in accordance with the Check Clearing for the 21st Century Act, for example).

Many of the embodiments of the invention are implemented within a transaction processing system, an example of which is illustrated by FIG. 1. The system 100 of FIG. 1 can be used for a variety of purposes, including without limitation peauthorizing, authorizing and/or settling a presentation instrument, as described in further detail below. One skilled in the art will appreciate that a financial intermediary, and specifically, a financial transaction provider (referred to herein as a "check processor") often will process and/or facilitate transactions involving presentation instruments, including without limitation check payment transactions. Processing such a transaction might also include (but need not necessarily include) negotiating the presentation instrument on behalf of the merchant and/or the merchant's bank (using, for example, an automated clearinghouse ("ACH") or the like). The system 100 may also be used for other purposes, such as for third-party check acceptance verification and/or authorization, and/or the like The system 100 comprises one or more point of sale ("POS") devices 105 in communication with a host computer 110. In an aspect, one or more of the POS devices 105 may be located at a merchant location. In some cases, a check processor provides a POS device 105 for use by a merchant; in other cases, the merchant might obtain the POS device 105 independently. In some embodiments, multiple merchants may participate in the system 100 and/or a single merchant might have multiple locations. In such case, there may be one or more POS devices 105 located at each merchant and/or location.

A POS device 105 can be any type of device that provides data communication with a host computer 110. Often, a POS device 105 will be a specialized terminal having specified hardware (including communication hardware for communicating with the host, and/or hardware for reading and/or scanning one or more types of financial instruments) and/or will be incorporated with a cash register. In other cases, a POS device 105 might be a general-purpose computer programmed to function as an interface to the host computer 110, perhaps with specialized input hardware for reading and/or scanning financial instruments. In some cases, a POS device 105 might even be a telephone, which might provide communication with a host computer via an interactive voice response ("IVR") system.

In most cases, the POS device 105 will comprise one or more input devices, which can include, without limitation, keypads (alphabetic and/or numeric, etc.), magnetic stripe readers, bar code readers, input ports, magnetic ink character recognition ("MICR") scanners and/or optical scanners (perhaps with associated character recognition software), and/or input ports (e.g., for receiving input from other devices, personal computers, cash registers, etc.), and/or the like. The POS device 105 generally will also comprise one or more output devices (in addition to the communication hardware), such as a display (and/or an output port for communicating with an external display), a printer (and/or an output port for communicating with an external printer), output ports for providing data to a personal computer, cash register, and/or the like. One or more of these input and/or output devices (with might be incorporated within a single input/output device, in some cases) provide a user interface for the POS device 105, to allow interaction with a customer, a merchant (or, more specifically, an operator of the POS device 105 at a merchant location), etc.

The host computer 110, which can be any computer system (which might comprise one or more computers) that is capable of processing financial transactions and/or communicating with appropriate entities (including, without limitation, various financial institutions, an ACH, etc.) for performing methods of the invention. In a general sense, the host computer 110 is configured (through one or more software applications, which are generally stored on a computer readable medium accessible to the host computer 110 and which comprise instructions that are executable by the host computer 110) to perform a variety of operations for processing (or facilitating the processing of) financial transactions.

Of particular relevance to the present disclosure, the host computer 110 is configured generally to receive a request (e.g., from a POS device 105) to preauthorize acceptance of a presentation instrument by a merchant, based on data, received by the merchant, about the presentation instrument. This process is described in detail below, but in a general sense, the host computer 110 evaluates the request and either preauthorizes the acceptance of the presentation instrument or declines to do so (or perhaps seeks additional information about the presentation instrument, the transaction, and/or the parties thereto). Based on this preauthorization, which may be transmitted back to the POS device 105 that generated the request, the merchant can decide whether to provide goods and/or services to the customer. Assuming the merchant decides to provide the goods/services, the merchant will receive a presentation instrument (e.g., a personal or business check) in return. At this point, the POS 105 at the merchant can be used to send a request to authorize acceptance of the presentation instrument. Based on an evaluation of this request (again, as described in detail below), the host computer 110 will approve or decline the authorization request, and optionally transmit a corresponding message to the POS device 105 to provide notification of the decision to the merchant. Optionally, the host computer 110 can be configured to settle and/or negotiate the presentation instrument on behalf of the merchant.

The host computer 110 may comprise one or more applications that support the functionality of the invention, including for example, by comprising instructions that are executable by a computer (such as the host computer) to perform operations in accordance with methods of the invention, as described in detail below. FIG. 1 illustrates one exemplary arrangement of such applications—in other embodiments, the functionality of the host computer might be allocated differently among these or other applications (and/or might be consolidated into a single application. Similarly, while FIG. 1 depicts the applications as executing on a single host computer 110, it should be appreciated that the functionality of these applications could be divided among a plurality of computers (e.g., each application could execute on a separate machine).

In the exemplary arrangement of FIG. 1, the host computer 110 executes a transaction processing application 115, which operates, in one aspect, similarity to transaction processing applications known in the art. In an embodiment, the transaction processing application is configured to be the point of communication between the host computer 110 and the point of sale devices 105a. The transaction processing application 115 might also handle other transaction processing tasks, such as communication with financial institutions and/or networks to process financial transactions, settle and/or negotiate presentation instruments, etc.

The host computer 110 also may execute an authorization application 120, which provides instructions for evaluating various requests to perform financial transactions. Of particular relevance to the present disclosure, the authorization application 120 performs various techniques to evaluate requests for preauthorization and/or authorization to accept presentation instruments, as described in further detail below.

It should be appreciated as well that the system 100 might store various types of data (in particular, data common to financial transactions) in one or more databases and/or other appropriate data stores. Merely by way of example, a transaction database 125 might be used to store data about transactions (e.g., amount of transaction, payer and payee, financial institutions involved, whether the transaction has cleared, etc.), and, in particular, data about presentation instruments submitted for preauthorization (so that, for example, this data can be compared with data received later in a request to authorize the acceptance of the presentation instrument). Such data can include, without limitation, an estimated payable amount of the presentation instrument, a date/time of submission of the preauthorization request, a record of a preauthorization decision (e.g., approve, decline, etc.) made with respect to the preauthorization request, etc.

In some embodiments, the host computer 110 (and, in particular aspects, the authorization application 120) might be configured to evaluate authorization and/or preauthorization requests based both on contemporary data about the requested transaction and historical data about the relevant parties (e.g., the merchant, customer or other check writer, their respective financial institutions, and/or the like). Merely by way of example, a check processor (and, specifically the host computer 110 and/or authorization application 120) might use a variety of information in determining whether to approve or decline a preauthorization request. This information falls into several categories related to both the customer and the bank account on which the check has been written. Examples of this type of information for the customer can include, without limitation, the number of checks presented in a certain time period, the amount of the check, the customer's personal check writing history, including any instances of suspected fraud, returned checks, and/or the like. Examples of information related to the presentation instrument can include, without limitation, recognizable bank account formatting, amount of the instrument, and/or past fraudulent use of the bank account on which the instrument is drawn. Other factors to be considered can include the history of the merchant in accepting bad checks, the nature and/or value of the goods/services provided in exchange for the check, the merchant's geographic location (e.g., in comparison with an address associated with the account on which the check is written), the nature or type of merchant and/or a typical amount on checks accepted by the merchant, etc.

Data for performing such analyses might be stored in one or more risk profile databases 130 and/or other appropriate data stores. Hence, the risk profile database 130 can be used to store, inter alia, data about check writing activities, and/or other direct deposit activities of various check-writing and/or check-accepting entities (which can include, but are not necessarily limited to, the customer and/or the merchant).

The arrangement of components in the system 100 is discretionary, and one skilled in the art will appreciate that a variety of such arrangements might be employed in accordance with different embodiments of the invention and/or implementation requirements. Exemplary hardware arrangements of the POS devices 105, host computer 110 and databases are described in further detail below with respect to FIGS. 4 and 5

Figure 2:
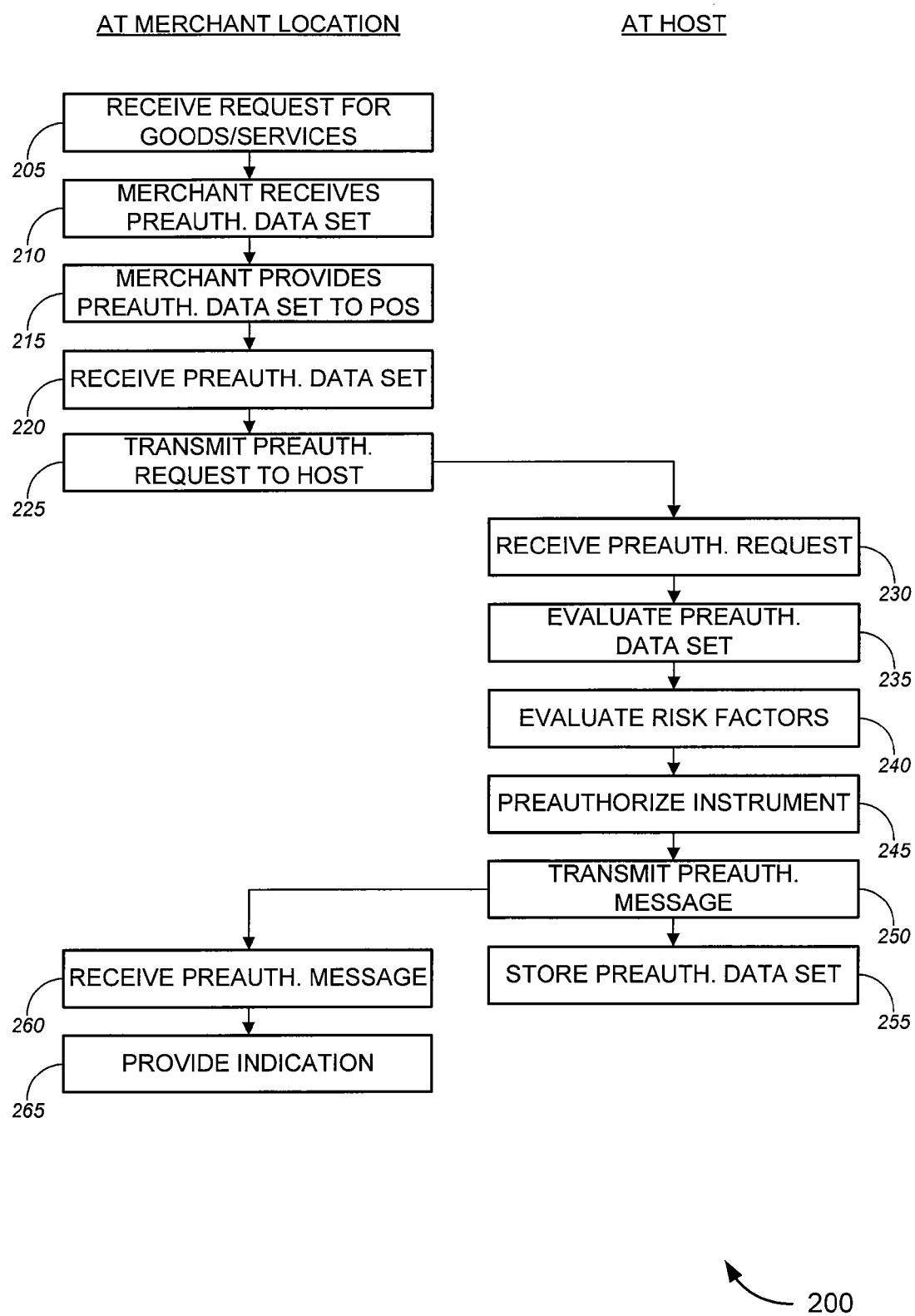
FIGS. 2 and 3 illustrate are process flow diagrams illustrating a method of providing personal check acceptance services, in accordance with various embodiments of the invention.
Figure 3:
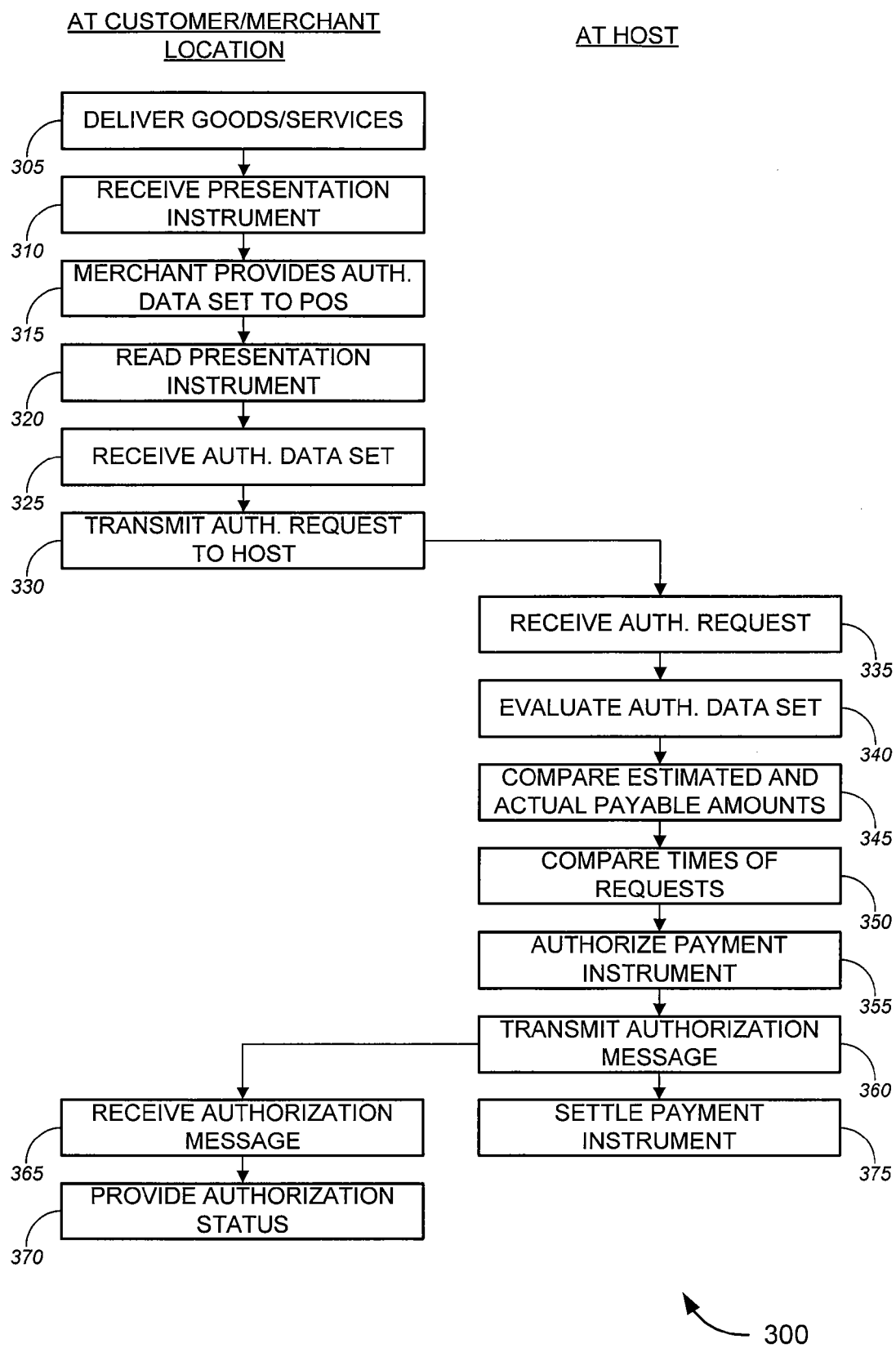

FIGS. 2 and 3 generally illustrate procedures that are performed by the system 100 (and/or various components thereof) in accordance with specific embodiments of the invention, and FIGS. 2 and 3, therefore, may be described below by reference to systems similar to the system 100 of FIG. 1 and/or components thereof. It should be appreciated, however, that the methods depicted by FIGS. 2 and 3 can be implemented by any suitable computer system and are not limited to any particular functional or structural arrangement. Likewise, the system 100 can be configured to operate in a variety of different configurations, and the operation of the system 100 therefore should not be considered to be limited to the procedures described below with respect to FIG. 2 and 3.

FIG. 2 illustrates a method 200 of preauthorizing a presentation instrument, which generally can be implemented before the merchant receives the presentation instrument itself. FIG. 3 illustrates a method 300 of approving a presentation instrument after it has been received by a merchant. In one aspect, the methods 200 and 300 can be used in conjunction, such that the method 200 is used to preauthorize a presentation instrument, and the method 300 is used thereafter to authorize the presentation instrument and, optionally to settle the presentation instrument. It should be appreciated, however, that the methods 200 and 300 can be used in isolation from each other, and that various procedures of each the methods 200 and 300 can be combined in a variety of different ways, in accordance with different embodiments of the invention.

In one embodiment, the method 200 of FIG. 2 comprises a merchant receiving, from a customer, a request for goods and/or services (block 205). This request can take any of several forms, including without limitation, a telephone order, an in-person order at the point of sale, an Internet order, and/or the like. Upon receiving the request for goods and/or services, the merchant obtains (at least in part) from the customer a set of data about a presentation instrument the customer will use to pay for the requested goods and/or services. The merchant can obtain this data in any number of ways, including, merely by way of example, vocally (e.g., by telephone, in person, etc.), via electronic communication (e.g., via facsimile transmission, via electronic mail, via a web-based form, etc.), and/or the like.

This set of data (which may be all or a portion of what is referred to herein as a "preauthorization data set") typically will include a variety of information about the presentation instrument, including without limitation one or more of the following: an estimated payable amount of the instrument, a check number (or other identifier), an account number of the account on which the instrument is drawn, name of financial institution on which the instrument is drawn, routing number of the financial institution on which the instrument is drawn, and the like. Hence, in an aspect, the data received from the customer will be sufficient to identify the presentation instrument that is going to be used to pay for some or all of the goods/services ordered by the customer. In some cases, the customer may provide the estimated payable amount, while in other cases, the estimated payable amount may be determined (e.g., by the merchant, at a cash register, and/or at the POS device) based on the extended sales price of the goods or services the customer would like to purchase. This set of data may also include information about the customer (such as a full name, an address, an identifier from a driver's license and/or other government-issued identification, etc.).

Notably, in accordance with some embodiments, the data about the presentation instrument and/or the customer is provided by the customer to the merchant before the goods/services are delivered, and/or before an actual check (or presentation instrument) is received from the user. This feature allows a merchant to preauthorize the transaction without having to possess the presentation instrument itself, and allows merchants and customers substantially enhanced flexibility in their dealings. Using embodiments of the invention, for example, a customer can place a phone order without having to use a credit card, and the merchant can still be reasonably assured that the customer will be able to pay for the ordered goods/services.

In some cases, the preauthorization data set will include other information, which may be provided by the customer and/or the merchant, and/or might be supplied by the POS device and/or the host computer, including without limitation a date/time stamp noting the date and/or time of the preauthorization request (this value may also be supplied by the POS device and/or the host computer), nature of goods/services provided in exchange for the presentation instrument, value of goods/services provided in exchange for the presentation instrument, geographical location of the merchant, and/or type of merchant (e.g., dry goods, hardware and building materials, wholesale sales, and/or the like).

Upon receiving the preauthorization data set (or a portion thereof) (block 210), the merchant provides this data to the POS device, along with any additional data supplied by the merchant (as noted above) (block 215). In an aspect, providing the data to the POS device might comprise providing input to the POS device via one or more of the input devices described above (such as a keyboard and/or keypad, for example). After the POS device receives the preauthorization data set (or a portion thereof) from the merchant (block 220), for example by receiving input from the merchant and/or customer, the POS device adds any necessary additional data (which may be stored in a memory at the POS device), such as an identifier of the POS device and/or the merchant, a merchant location, a date/time of request, etc., and transmits a preauthorization request (comprising the preauthorization data set) to the host computer (block 225). Any of a variety of known techniques, media, and/or protocols may be used for communication between the POS device and the host computer, including without limitation transmission of the preauthorization request.

In some cases, upon receiving the preauthorization request (along with some or all of the preauthorization data set) at the host computer (block 230), the host computer will also look up and/or provide any necessary additional data for the preauthorization data set that might be stored at the host computer and/or a data store in communication with the host computer. Such information may include, without limitation, date/time of the request (if not provided by the POS device), merchant identity and/or location (perhaps using an identifier of the POS device as a search key).

The host computer then evaluates the preauthorization request (or more precisely, in some embodiments, evaluates the preauthorization data set) (block 235). Evaluation of the preauthorization request can comprise a variety of operations and/or techniques. In one embodiment, evaluation of the request comprises evaluating one or more risk factors associated with the request (block 240). These risk factors, in one aspect, may be grouped together in a risk profile for the request, the merchant, and/or the customer. Risk factors can include, without limitation, the identity of the customer, the status (active, inactive, etc.) of the account on which the presentation instrument is drawn, a history of the account on which the instrument is drawn (e.g., a history of returned checks, stopped payments, etc.), the amount of the estimated payable amount (e.g, whether the amount appears reasonable in comparison with the goods/services provided in return), the location of the merchant, the type of merchant, and/or the like In an aspect, risk factors may be evaluated by comparison and/or lookup against a database comprising data about past transactions, behaviors, etc. of the merchant, the customer, and/or the presentation instrument (and/or a financial account associated with the presentation instrument).

Based on the evaluation of the request (and, in some cases, more specifically the evaluation of the preauthorization data set), the host computer preauthorizes the acceptance of the instrument, i.e., grants the preauthorization request (this is sometimes referred to herein as "preauthorizing the presentation instrument," although it more properly may be considered preauthorizing the merchant to accept the payment instrument) (block 245). Alternatively, if the evaluation of the request indicates that it should not be approved (e.g., if an evaluation of the risk factors indicates that there is an unacceptable risk that the presentation instrument will not be honored), the host computer might decline the preauthorization request, and/or, in some cases, if the host computer determines that there is not sufficient information to preauthorize the request, the host computer might request additional information from the merchant via the POS device.

In an embodiment, the host computer then transmits a preauthorization message to the POS device (again, using any suitable medium, protocol, technique and/or format) (block 250). In an aspect, the preauthorization message evidences the preauthorization decision made by the host computer (e.g., to approve the preauthorization request, to deny the request, etc.); hence, if the host computer preauthorized acceptance of the presentation instrument, the preauthorization messages evidences (informs the POS device) of that fact.

In some embodiments, the host computer stores the preauthorization data set in a database and/or other appropriate data store (block 255). This stored information may also include a record of the status of the preauthorization request (approved, denied, etc.). In this way, if the merchant later requests authorization to accept the presentation instrument (as described below, for example), the host computer can reference the preauthorization data set for comparison with data obtained from the actual presentation instrument.

Upon receiving the preauthorization message (block 260), the POS device generally will provide an indication of the status of the preauthorization request (block 265), e.g., via an output device, such as by displaying the indication on a display device, printing the indication on a receipt with a printer and/or the like. This indication will provide notice to the merchant that the request was approved (i.e., that acceptance has been preauthorized) or denied (i.e., that acceptance has not been preauthorized), or that more information is needed, so that the merchant can act accordingly.

Turning now to FIG. 3, assuming (in one aspect) that the merchant did receive preauthorization to accept the customer's presentation instrument, the merchant will arrange for delivery of the goods/services (block 305). Any delivery technique can be used, including pickup at the point of sale, delivery by an employee/agent of the merchant, delivery by postal mail and/or common carrier, electronic delivery, and/or the like.

The customer then provides the presentation instrument (usually, but not always, upon delivery of the goods/services. Upon receiving the presentation instrument (block 310), the merchant provides another set of data to the POS device (block 315). This second set of data provided by the merchant, which forms some or all of what is described herein as an "authorization data set," typically will include data derived from the actual presentation instrument itself. The authorization data set, in some aspects, includes information similar to the preauthorization data set, except that the data in the authorization data set is derived from the presentation instrument itself (which is, at this point, in the possession of the merchant, in accordance with some embodiments of the invention), instead of simply information relayed from the customer to the merchant. The authorization data set might include, for example, the actual payable amount (i.e., face value) of the presentation instrument, a check number (and/or other identifier), an account and/or routing number associated with the presentation instrument, a name of the financial institution at which the account is maintained, and/or the like. The authorization data set also may include a date/time stamp noting the date and/or time of the authorization request (which may be input by the merchant, calculated by the POS device and/or host, etc.). Like the preauthorization data set, the authorization data set may also include information about the customer (such as a full name, an address, an identifier from a driver's license and/or other government-issued identification, etc.).

In a particular set of embodiments, the POS device might obtain some or all of the data in the authorization data set by electronically reading the presentation instrument (block 320). Any of a number of techniques may be used to perform the electronic reading, including without limitation, optical scanning, MICR reading, bar code scanning, magnetic stripe reading, and/or the like. One skilled in the art will appreciate that the specific technique employed often will depend on the nature of the presentation instrument and/or the capabilities of the POS device (and/or any other devices). In addition (and/or as an alternative to) electronically reading the presentation instrument, some or all of the authorization data set may be obtained through various other input devices, including without limitation data entry (e.g., by the merchant) via a keypad/keyboard; data transfer from a cash register, PC, or other device; and/or the like.

Upon receiving the authorization data set (block 325), the POS device transmits an authorization request to the host computer (block 330), perhaps in a manner similar to that in which the preauthorization data set is transferred earlier. Upon receiving the authorization request (block 335), the host computer evaluates the authorization request (and, more specifically, the authorization data set) (block 340). In an aspect, because acceptance of the presentation instrument has been preauthorized, the host computer does not need to revisit any of the risk profile evaluation performed as part of the preauthorization (although this is possible in various embodiments). Instead, in an aspect, the host computer's evaluation of the authorization request comprises obtaining some or all of the stored preauthorization data set and comparing various parameters in that data set with corresponding parameters in the authorization data set.

Merely by way of example, in some embodiments, the host computer will compare the estimated payable amount from the actual payable amount of the presentation instrument, as recorded in the authorization data set (block 345). Specifically, in one aspect, the host computer determines whether the actual payable amount falls within a specified threshold range of the estimated payable amount, on which the preauthorization was based. In other words, the actual payable amount must not exceed the estimated payable amount by more than some threshold amount. This threshold amount can be based on either the estimated amount or the actual amount, and it can be either a relative range (e.g., the actual payable amount must not exceed the estimated payable amount by more than some specified percentage) or an absolute range (e.g., the actual payable amount must not exceed the estimated payable amount by more than some dollar amount). The size of the threshold amount is discretionary and typically will be determined empirically and/or based on the risk tolerance of the merchant and/or transaction processor. By way of example only, in some cases, the host computer, when comparing the payable amounts, might apply a rule that the actual payable amount cannot exceed the estimated payable amount by some specified percentage in the range between five and twenty-five percent.

Additionally and/or alternatively, the host computer might also evaluate the relative timing of the preauthorization request and the authorization request, based on the principle that the preauthorization becomes less reliable as the time gap between the requests lengthens. Hence, because the preauthorization request is made at a first point in time (as evidenced, for example, in a date/time stamp in the preauthorization data set), while the authorization request is made at a second point in time (which similarly can be indicated by the date/time stamp in the authorization data set and/or can be calculated from a system clock at the host computer during evaluation of the authorization request), evaluating the authorization request might further comprise comparing this first point in time with the second point in time (block 350). This comparison can involve determining whether the second period of time is within a threshold period of the first point in time. This threshold period is discretionary; like the threshold amount discussed above, the threshold period may be determined empirically (e.g., based on historical data about when preauthorization requests become stale and are no longer valid) and/or can be specified to reflect risk preferences of the transaction processor and/or merchant. In some cases, the threshold period might be as small as minutes or hours, while in other cases, the threshold period might be a day, a week, a month, etc.

In a particular aspect, the host computer might employ a sliding scale that takes into account both a comparison of the actual/estimated value and the timing of the preauthorization/authorization requests (as well, in some cases, as other factors). For instance, the threshold period of time might be longer if the actual payable amount is within a smaller threshold amount, while the threshold period might be shorter for a larger actual/estimated payable amount ratio.

Based on an evaluation of the authorization request (including, in some cases, a determination that the actual payable amount of the presentation instrument does not exceed the estimated payable amount by more than the threshold amount and/or a determination that the date/time of the authorization request is within the threshold period of the preauthorization request, the host computer authorizes acceptance of the payment instrument (block 355). In some cases, this authorization is automatic, based on the preauthorization and/or comparison of respective parameters in the preauthorization request and authorization request—in other words, assuming that the payment instrument was preauthorized and the comparison of parameters in the two requests comply with the host computer's guidelines, the authorization is approved without further analysis. In this way, the merchant can be confident that a preauthorized presentation instrument will be authorized for acceptance (so long as presentation instrument is submitted in timely fashion and does not exceed the estimated payable amount by an unacceptable margin). Of course, if the presentation instrument was not preauthorized, or falls outside of the payable amount and/or time thresholds, the authorization request might be declined, or the host computer might perform a full authorization process (including, for example, evaluation of risk factors associated with the presentation instrument, in the fashion described above) before determining whether the presentation instrument should be accepted.

Once the host computer has authorized acceptance of the presentation instrument (or declined authorization), the host computer transmits an authorization message to the POS device (block 360), in similar fashion to the transmission of a preauthorization message described above. The authorization message generally will indicate a status of the authorization request, and the POS device, upon receiving the authorization message (block 365) may be configured to provide an indication of the status of the authorization request (block 370), e.g., via an output device, such as by displaying the indication on a display device, printing the indication on a receipt with a printer and/or the like. This indication will provide notice to the merchant that the authorization request was approved (i.e., that acceptance has been authorized and the merchant should accept the presentation instrument) or denied (i.e., that acceptance has not been preauthorized and that the merchant is at risk of nonpayment if the presentation instrument is accepted), so that the merchant can act accordingly.

In some cases, the host computer may also be configured to settle and/or negotiate the presentation instrument (block 375), assuming the instrument has been authorized and the merchant has accepted the instrument. In some cases, the negotiation/settlement process can be performed based only the authorization data set (which, in an aspect, includes all necessary data from the presentation instrument) so that the merchant can receive the funds specified by the presentation instrument (i.e., the actual payable amount of the presentation instrument less any applicable processing and/or transaction fees) without requiring the merchant to actually deposit the presentation instrument in a financial institution.

A variety of techniques can be used for the settlement/negotiation process, including without limitation deposit of the paper check by the merchant; settlement via a substitute check and/or an image replacement document (per the Check Clearing for the 21st Century Act, for example); settlement using an ACH; settlement via a BOC and/or PPD transaction; settlement by remotely-created draft (in which the transaction processor prepares a duplicate presentation instrument, which may be similar in material respects to the presentation instrument accepted by the merchant, and settles that duplicate presentation instrument in lieu of the original), and/or the like.

Figure 4:
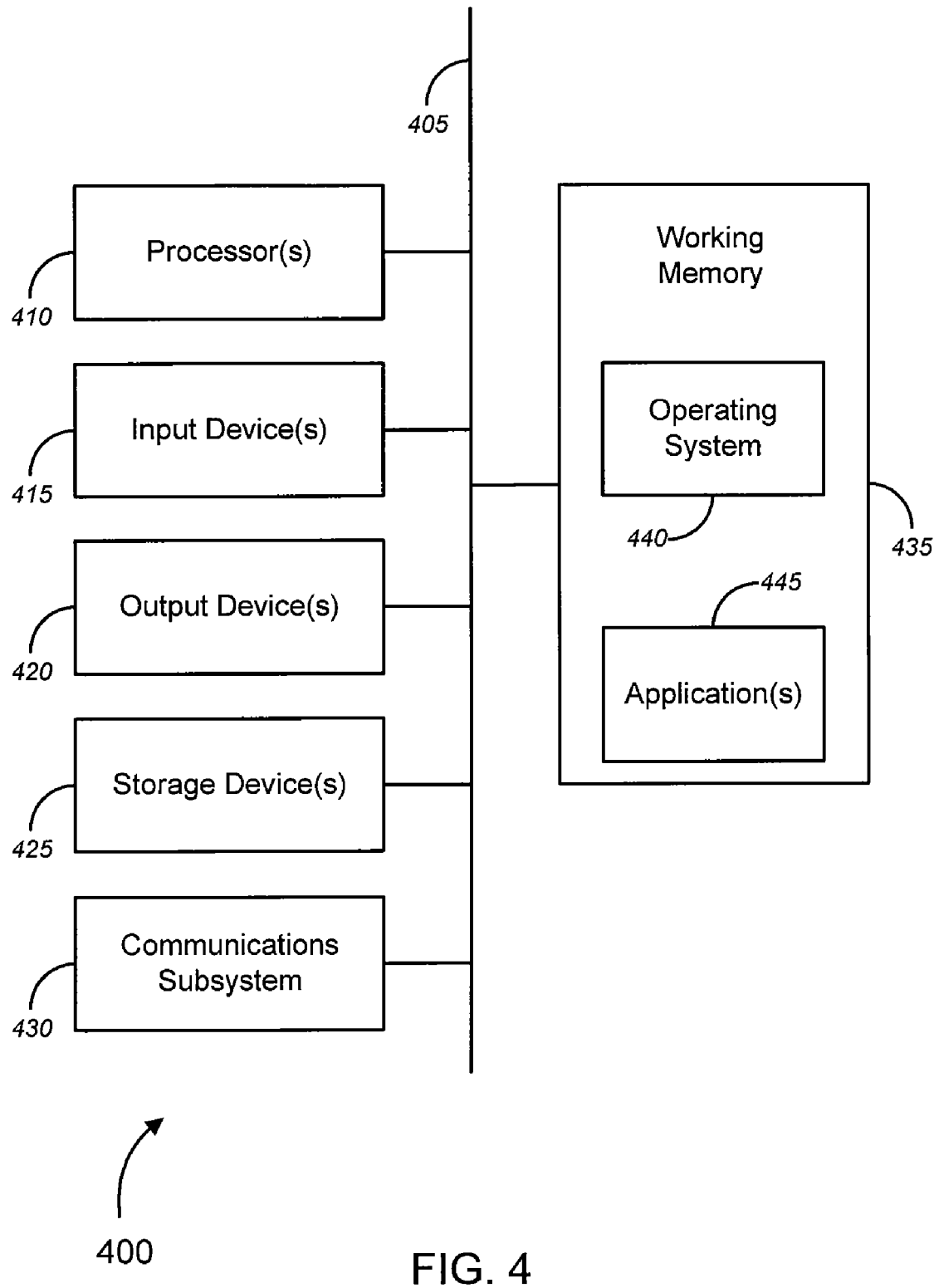
FIG. 4 is a generalized schematic diagram illustrating a computer system, in accordance with various embodiments of the invention.

FIG. 4 provides a schematic illustration of one embodiment of a device or computer system 400 that can perform the methods of the invention, as described herein, and/or can function as a POS device, host computer, and/or the like. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), a local communication facility (such as a serial port, parallel port, USB port, etc.) and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, firmware, software (including portable software, such as applets, etc.), or any combination thereof. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
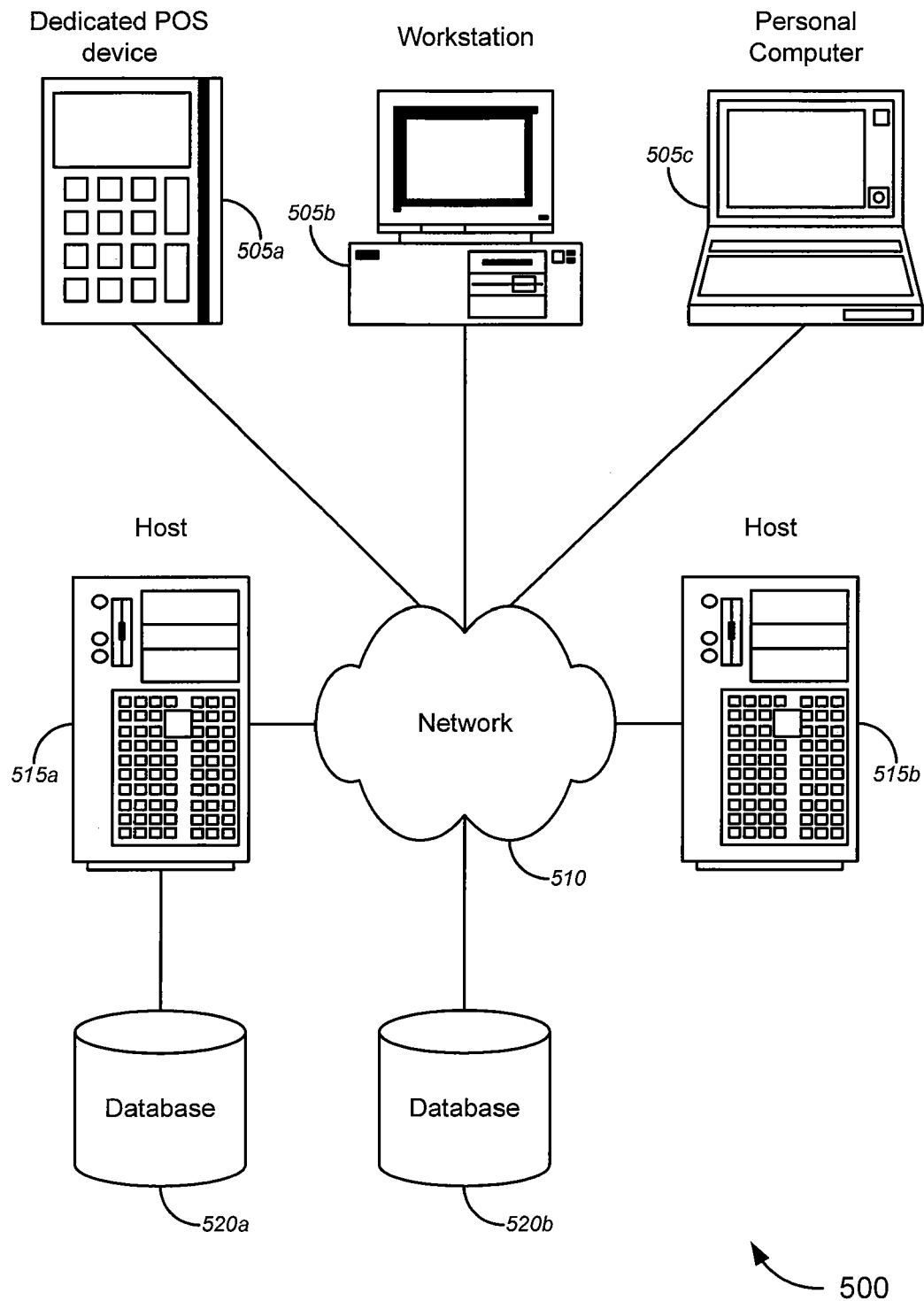
FIG. 5 is a block diagram illustrating a networked system of computers, which can be used in accordance with various embodiments of the invention.

FIG. 5 illustrates a schematic diagram of a system 500 that can be used in accordance with one set of embodiments. The system 500 can include one or more clients 505. In an aspect, a client 505 functions as a POS device described above. In some cases, a client is a dedicated POS device comprising specialized hardware, such as the Telecheck™ Eclipse™ and/or FD-2000™ payment terminals available from First Data Corp. In other cases, an electronic cash register might incorporate the functionality of an integrated POS device. Alternatively, a client 505 might be a general purpose personal computer 505c (including, merely by way of example, personal computers and/or laptop computers running any appropriate flavor of Microsoft Corp.'s Windows™ and/or Apple Corp.'s Macintosh™ operating systems) and/or workstation computers 505b running any of a variety of commercially-available UNIX™ or UNIX-like operating systems. ("Dumb" terminals may be used as well.) Such personal computers 505c and/or workstations 505b might be configured with software to operate as POS devices. These computers 505b, 505c can also have any of a variety of applications, including one or more applications configured to perform methods of the invention. Although the exemplary system 500 is shown with three clients 505, any number of user clients can be supported.

Certain embodiments of the invention operate in a networked environment, which can include a network 510. The network 510 can be any type of network familiar to those skilled in the art that can support data communications, including in particular, communications between a host computer and one or more POS devices, including networks using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

As noted above, embodiments of the invention can include one or more host computers 515. Each of the host computers 515 may be configured with an operating system, including without limitation any of those discussed above, as well as any commercially (or freely) available server operating systems, mainframe operating systems, and/or the like. Each of the host computers 515 may also be running one or more applications (including without limitation those applications described above), which can be configured to provide services to one or more clients 505 and/or other hosts 515.

The host computers 515, in some embodiments, might include one or more application servers, which can include one or more applications accessible by a client running on one or more of the clients 505 and/or other hosts 515. Merely by way of example, the hosts(s) 515 can be one or more general purpose computers capable of executing programs or scripts in response to the clients 505 and/or other hosts 515. Merely by way of example, an can be implemented as one or more scripts or programs written in any suitable programming language, such as Java™, COBOL, C, C#™, or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients 505 and/or other hosts 515.

In certain embodiments, the system can include one or more databases 520, each of which might comprise one or more tables, an arrangement familiar to those of skill in the art. The location of the database(s) 520 is discretionary: merely by way of example, a database 520*a* might reside on a storage medium local to (and/or resident in) a host 515*a* (and/or a user computer 505). Alternatively, a database 520*b* can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of accepting a presentation instrument, the method comprising:

receiving, at a merchant and from a customer at a location remote to the merchant, a request for goods or services;

the merchant receiving at a first point in time from the customer at the location remote to the merchant, a first set of data sufficient to identify a presentation instrument to be used to pay for at least a portion of the goods or services and comprising an estimated payable amount of the presentation instrument, wherein the merchant receives the presentation instrument only after the goods or services are provided wherein the presentation instrument is drawn upon an account at a financial institution;

the merchant providing the first set of data to a point of sale terminal at a location of the merchant;

receiving, at the point of sale terminal and from the merchant, the first set of data;

transmitting, from the point of sale terminal, the first set of data;

receiving the first set of data at a host computer;

storing the first set of data at the host computer;

evaluating the first set of data at the host computer, based on an evaluation of the set of data, preauthorizing, at the host computer, acceptance of the presentation instrument, wherein preauthorizing authorizes the merchant to receive the presentation instrument in the future for use in a payment transaction;

transmitting a preauthorization message from the host computer to the point of sale terminal, the preauthorization message evidencing a preauthorization of acceptance of the presentation instrument;

displaying, at the point of sale terminal, an indication of the preauthorization message;

delivering the goods or services to the customer, based at least in part on the preauthorization;

receiving, from the customer, the presentation instrument, upon delivery of the goods or services;

providing to the point of sale terminal, at a second point in time after delivery of the goods or services, a second set of data from the presentation instrument, the second set of data comprising an actual payable amount of the presentation instrument and account information associated with the presentation instrument;

transmitting the second set of data from the point of sale terminal to the host computer;

receiving the second set of data at the host computer;

evaluating the second set of data at the host computer, wherein evaluating the second set of data comprises comparing the estimated payable amount with the actual payable amount and comparing the first point in time with the second point in time;

automatically authorizing acceptance of the payment instrument, based on the preauthorization, a determination that the actual payable amount does not exceed the estimated payable amount by more than a threshold amount, and a determination that the second point in time is within a threshold period of the first point in time; and settling the payment instrument, based only on the second set of data, without requiring the merchant to deposit the payment instrument, such that the merchant receives an amount of funds specified by the payment instrument.

2. The method of claim 1, wherein the presentation instrument is a personal check.

3. The method of claim 1, wherein the first set of data is sufficient to identify the customer.

4. The method of claim 1, wherein settling the payment instrument comprises settling a remotely created draft via the automated clearinghouse.

5. The method of claim 1, wherein settling the payment instrument comprises settling an image replacement document.

6. The method of claim 1, wherein settling the payment instrument comprises settling the payment instrument electronically via an automated clearinghouse.

7. The method of claim 1, wherein the merchant receives at least a portion of the first set of data via a telephone call with the customer.

8. The method of claim 1, wherein the estimated payable amount is based on a sales price of the goods or services.

9. The method of claim 8, wherein the sales price includes one or more of the following: a sales tax, a delivery fee, and a service fee.

10. The method of claim 1, wherein receiving the second set of data comprises reading the presentation instrument at the point of sale device, using an input device selected from the group consisting of an optical scanner with or without character recognition software, a bar code scanner, a magnetic stripe reader, and a magnetic ink character recognition ("MICR") reader.

11. In a transaction in which a merchant receives a request from a customer for goods or services, at least a portion of the goods and services to be purchased using a presentation instrument to be received by the merchant after delivery of the goods or services, a method comprising:

receiving, at a first point of sale device from a customer at a location remote to the first point of sale device, a first set of data sufficient to identify a presentation instrument to be used to pay for at least a portion of the goods or services and comprising an estimated payable amount of the presentation instrument, wherein the presentation instrument is drawn upon an account at a financial institution;

transmitting, from the first point of sale device, the first set of data;

receiving the first set of data at a host computer;

storing the first set of data at the host computer;

evaluating the set of data at the host computer, based on an evaluation of the set of data, preauthorizing, at the host computer, acceptance of the presentation instrument, wherein preauthorizing authorizes the merchant to receive the presentation instrument in the future for use in a payment transaction;

receiving, at a second point of sale device after delivery of the goods or services and upon receipt of the presentation instrument by the merchant, a second set of data derived from the presentation instrument, the second set of data comprising an actual payable amount and account information associated with the presentation instrument;

transmitting the second set of data from the second point of sale device to the host computer;

receiving the second set of data at the host computer;

evaluating the second set of data at the host computer, wherein evaluating the second set of data comprises comparing the estimated payable amount with the actual payable amount; and automatically authorizing acceptance of the payment instrument, based on the preauthorization and an evaluation of the second set of data.

12. The method of claim 11, wherein the first point of sale device and the second point of sale device are the same point of sale device.

13. The method of claim 11, further comprising:

settling the payment instrument, based only on the second set of data, without requiring the merchant to deposit the payment instrument.

14. The method of claim 13, wherein settling the payment instrument comprises settling the payment instrument using a prearranged payment and deposit ("PPD") transaction.

15. The method of claim 13, wherein settling the payment instrument comprises settling the payment instrument using a back office conversion ("BOC") transaction.

16. The method of claim 11, wherein evaluating the second set of data further comprises comparing the first point in time with the second point of time, and wherein automatically authorizing acceptance of the payment instrument comprises automatically authorizing acceptance of the payment instrument based further on a determination that the second point in time is within a threshold period of the first point in time.

17. The method of claim 16, wherein the threshold period is within a range from about one minute to about one day.

18. The method of claim 16, wherein the threshold period is within a range from about one day to about one month.

19. The method of claim 11, wherein automatically authorizing acceptance of the payment instrument comprises automatically authorizing acceptance of the payment instrument based further on a determination that the actual payable amount does not exceed the estimated payable amount by more than a threshold amount.

20. The method of claim 11, wherein the threshold amount is within a range from about five percent of the estimated payable amount to about twenty five percent of the estimated payable amount.

21. The method of claim 11, wherein preauthorizing acceptance of the presentation instrument comprises evaluating one or more factors selected from the group consisting of an identity of the customer, whether the account at the financial institution is active, whether the account at the financial institution has a history of returned checks, whether the estimated payable amount is considered a reasonable amount for the goods and services, a location of the merchant, and a type of the merchant.

22. In a transaction in which a merchant receives a request from a customer for goods or services, at least a portion of the goods and services to be purchased using a presentation instrument to be received by the merchant after delivery of the goods or services, a method comprising:
   receiving, at a host computer and from a point of sale device, a first set of data sufficient to identify a presentation instrument to be used to pay for at least a portion of the goods or services and comprising an estimated payable amount of the presentation instrument, wherein the presentation instrument is drawn upon an account at a financial institution;
   storing the first set of data at the host computer;
   evaluating the first set of data at the host computer,
   based on an evaluation of the set of data, preauthorizing, at the host computer, acceptance of the presentation instrument, wherein preauthorizing authorizes the merchant to receive the presentation instrument in the future for use in a payment transaction;
   receiving, at the host computer and from a point of sale device after delivery of the goods or services, based upon receipt of the presentation instrument by the merchant, a second set of data derived from the presentation instrument, the second set of data comprising an actual payable amount and account information associated with the presentation instrument;
   evaluating the second set of data at the host computer, wherein evaluating the second set of data comprises comparing the estimated payable amount with the actual payable amount;
   automatically authorizing acceptance of the payment instrument, based on the preauthorization and an evaluation of the second set of data;
   transmitting, from the host computer and to the point of sale device, an authorization message that instructs the point of sale device to display an authorization indication for the merchant.

23. The method of claim 22, further comprising:
   settling the payment instrument, based only on the second set of data, without requiring the merchant to deposit the payment instrument.

24. In a transaction in which a merchant receives a request from a customer for goods or services, at least a portion of the goods and services to be purchased using a presentation instrument to be received by the merchant after delivery of the goods or services, computer system, the computer system comprising:
   a host computer, comprising:
      a processor;
      a communication interface in communication with the processor; and
      a computer readable medium in communication with the processor, the computer readable medium comprising a set of instructions executable by the processor to perform one or more operations, the set of instructions comprising:
         instructions for receiving, via the communication interface, a first set of data sufficient to identify a presentation instrument to be used to pay for at least a portion of the goods or services and comprising an estimated payable amount of the presentation instrument, wherein the presentation instrument is drawn upon an account at a financial institution;
         instructions for storing the first set of data;
         instructions for evaluating the first set of data;
         instructions for preauthorizing, based on an evaluation of the set of data, acceptance of the presentation instrument wherein preauthorizing authorizes the merchant to receive the presentation instrument in the future for use in a payment transaction;
         instructions for receiving after delivery of the goods or services, via the communication interface and based upon receipt of the presentation instrument by the merchant, a second set of data derived from the presentation instrument, the second set of data comprising an actual payable amount and account information associated with the presentation instrument;
         instructions for evaluating the second set of data, wherein evaluating the second set of data comprises comparing the estimated payable amount with the actual payable amount; and
         instructions for automatically authorizing acceptance of the payment instrument, based on the preauthorization and an evaluation of the second set of data.

25. The computer system of claim 24, further comprising:
   a point of sale device in communication with the communication interface, the point of sale device comprising a second processor and a second computer readable medium in communication with the second processor, the second computer readable medium comprising a second set of instructions executable by the point of sale device, the second set of instructions comprising:
   instructions for receiving the first set of data from the merchant;
   instructions for transmitting the first set of data to the host computer;
   instructions for receiving the second set of data from the merchant; and
   instructions for transmitting the second set of data to the host computer.

26. The computer system of claim 25, wherein:
   the first set of instructions further comprises:
      instructions for transmitting, via the communication interface, an authorization message for reception by the point of sale device; and
   the second set of instructions further comprises:
      instructions for receiving the authorization message; and
   instructions for displaying an authorization indication for a user.

27. An apparatus, comprising computer readable medium having encoded thereon a set of instructions executable by a computer system to perform a set of one or more operations, the set of instructions comprising:
   instructions for receiving, at the computer system, a first set of data sufficient to identify a presentation instrument to be used to pay for at least a portion of goods or services and comprising an estimated payable amount of the presentation instrument, wherein the presentation instrument is drawn upon an account at a financial institution;

instructions for storing the first set of data;

instructions for evaluating the first set of data;

instructions for preauthorizing, based on an evaluation of the set of data, acceptance of the presentation instrument, wherein preauthorizing authorizes the merchant to receive the presentation instrument in the future for use in a payment transaction;

instructions for receiving, at the computer system and based upon receipt of the presentation instrument by the merchant after delivery of the goods or services, a second set of data derived from the presentation instrument, the second set of data comprising an actual payable amount and account information associated with the presentation instrument;

instructions for evaluating the second set of data, wherein evaluating the second set of data comprises comparing the estimated payable amount with the actual payable amount; and instructions for automatically authorizing acceptance of the payment instrument, based on the preauthorization and an evaluation of the second set of data.

28. The apparatus of claim 27, further comprising a second computer readable medium having encoded thereon a second set of instructions executable by a second computer system to perform one or more operations, the second set of instructions comprising:

instructions for receiving the first set of data from the merchant;

instructions for transmitting the first set of data to the host computer;

instructions for receiving the second set of data from the merchant; and instructions for transmitting the second set of data to the host computer.

* * * * *